Sept. 27, 1955 W. O. BAZHAW 2,718,930
METHOD OF DEEP WELL SURVEYING
Filed July 5, 1952

INVENTOR.
W. O. Bazhaw
BY
ATTORNEY

United States Patent Office 2,718,930
Patented Sept. 27, 1955

2,718,930

METHOD OF DEEP WELL SURVEYING

Willis O. Bazhaw, Tulsa, Okla.

Application July 5, 1952, Serial No. 297,264

4 Claims. (Cl. 181—0.5)

This invention relates to an improved method of geophysical prospecting.

As is well known in the art, geophysical prospecting is usually accomplished by detonating a blasting charge at or near the surface of the earth. Ordinarily the charge is placed in a bore hole varying anywhere from five to two hundred fifty feet in depth. The reflected seismic waves are received and recorded by suitable seismometers distributed along the surface of the earth adjacent the bore hole. It will be apparent that the weathered layer, which is usually located near the surface of the earth, hampers the transmission of the seismic waves downwardly, as well as the reflected seismic waves which are to be received by the seismometers. To overcome this detriment, it has frequently been the practice to drill the bore hole to such a depth that the blasting charge may be placed below the weathered layer. However, the reflected seismic waves still must pass upwardly through the weathered layer to the seismometers. A further disadvantage of the present methods of geophysical prospecting is the reception of multiple reflections caused by the competent beds at or near the surface. Such multiple reflections are usually of such high frequency that they completely mask or obscure any deeper reflections noted on the seismic records. Furthermore, the horizontal area in which sub-surface information is obtained by use of the present methods is extremely limited. The area which can be covered or investigated is limited by the area over which the surface seismometers are located.

The present invention contemplates a novel method of geophysical prospecting wherein a plurality of seismometers are disposed in vertical spaced relation in the lower portion of a deep bore hole, such as an abandoned oil well or the like, to provide a vertical seismometer spread. A blasting charge is also provided in the bore hole adjacent the vertical seismometer spread. When the blasting charge is detonated, seismic waves are disbursed in substantially every direction from the bore hole to reflect from any oil traps in the vicinity of the bore hole. Since the seismic waves will be more readily transmitted in the formation in which the blasting charge is detonated, the major portion of the seismic waves will travel in substantially a horizontal direction from the bore hole to contact any oil bearing traps located at substantially the level of the blasting charge. However, a portion of the seismic waves will also be disbursed downwardly and in an oblique direction from the bore hole to be reflected from oil bearing traps located at a level below the seismic energy source.

It is also contemplated to provide an X-spread of seismometers on the surface of the earth adjacent the bore hole to receive any components of the reflected seismic waves which are refracted upwardly to the surface. Thus, the direction of the reflecting surface from the bore hole may be determined. By use of the present method, several types of geological features which serve as oil bearing traps, and which cannot be found by present geophysical methods, may be located. These special types of oil traps may be considered to consist mainly of buried reef masses, salt domes, major fault planes, and certain types of stratigraphic traps, such as pinch-outs against flanks of basins. At the present time, these oil and gas traps are usually found by random drilling with the accompanying high cost of discovery.

An important object of the present invention is to provide a method of geophysical prospecting for locating several types of oil bearing formations which cannot be located with present seismic methods.

Another object of this invention is to provide a novel method of geophysical prospecting wherein the seismic waves are generated well below the weathered layer and the reflected seismic waves are received at a position also well below the weathered layer.

A further object of this invention is to eliminate the multiple reflections of seismic waves, as well as other disturbances, at or near the surface of the earth in geophysical prospecting.

Another object of this invention is to provide a novel method of geophysical prospecting wherein the maximum area may be investigated in a minimum of time.

Another object of this invention is to locate off-shore oil bearing formations from shore positions.

A still further object of this invention is to provide an efficient method of geophysical prospecting which may be economically practiced.

Other objects and advantages of the invention will be evident from the following detailed description, read in conjunction with the accompanying drawings, which illustrate my invention.

Figure 1:
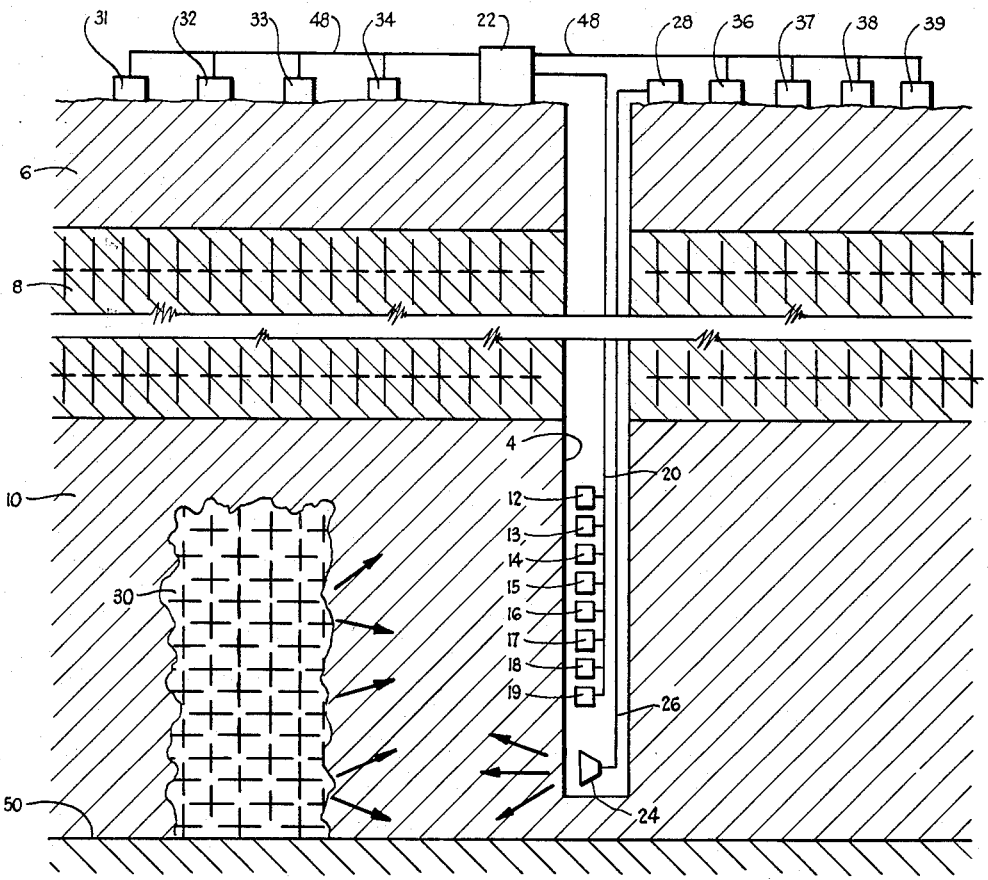
Figure 1 is a vertical sectional view of a bore hole and adjacent formations illustrating the disposition of apparatus utilized in practicing the present invention.

Referring to the drawings in detail, reference character 4 designates a bore hole formed in the earth and extending downwardly through the various formations 6, 8 and 10. The bore hole 4 is preferably at least two thousand five hundred feet deep and may be as deep as five to ten thousand feet or deeper. It is contemplated to utilize an abandoned oil well as the bore hole 4. However, in certain areas, such as undeveloped areas or areas wherein the oil bearing formations are relatively shallow, it may be necessary or desirable to drill the bore hole 4. In these last mentioned instances, the bore hole 4 may be drilled to a relatively shallow depth, such as two thousand five hundred feet or the like. Although I have shown the bore hole 4 as extending through only three different types of formations, it will be understood that it may extend through any number of formations, depending upon the area surveyed.

A plurality of seismometers 12 through 19 are supported in the bore hole 4 in vertical spaced relation in any suitable manner to provide a vertical seismometer spread within the formation 10. The seismometers 12 through 19 are interconnected by the usual conduit or lead 20 to a recorder 22 on the surface. It will be apparent that any number of seismometers may be utilized in the vertical seismometer spread, providing the area covered by the spread is sufficient. It is preferable that this vertical seismometer spread cover a distance approximating one thousand feet in the bore hole 4.

A blasting charge 24 is provided in the bore hole 4 below the vertical seismometer spread to create the seismic energy. The charge 24 is connected by the usual electrical conduit 26 to a detonator 28 on the surface to facilitate detonation of the charge.

It will be apparent that upon actuation of the detonator 28, the charge 24 will be set off to disperse seismic waves in substantially every direction from the lower portion of the bore hole 4. Since the seismic waves created in the formation 10 will tend to remain therein, the larger portion of the seismic waves generated by detonation of the charge 24 will travel in substantially a horizontal direction from the bore hole 4. In other words, the upper and lower extremities or bedding planes of the formation 10 will act as seismic wave guides. Thus, the seismic waves will travel horizontally from the bore hole 4 until they are either dissipated or are reflected by a formation having a seismic velocity different from the seismic velocity of the formation 10.

Reference character 30 indicates a distant buried reef or the like which may be oil bearing formation which will have a seismic velocity different from the seismic velocity of the formation 10. Therefore, the seismic waves will be reflected from the reef 30 either horizontally, to return to the vertical seismometer spread in the bore hole 4, or refracted vertically to the surface.

Figure 2:
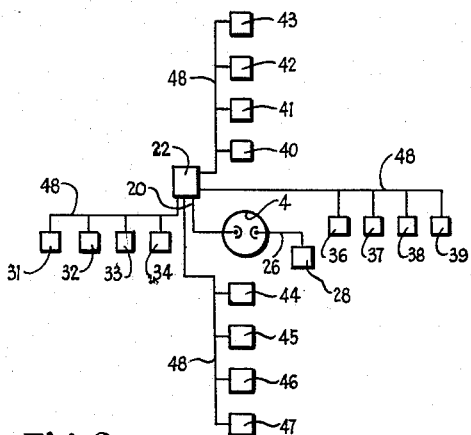
Figure 2 is a plan view of the bore hole shown in Fig. 1, illustrating the location of the surface seismometers.

To receive the components of the reflected waves that are refracted back to the surface and hence determine the direction of the reef 30 from the bore hole 4, I provide (see Fig. 2) a series of surface seismometers 31 through 34 and 36 through 39 in aligned relation to opposite sides of the bore hole 4. In addition, I provide a second series of surface seismometers 40 through 43 and 44 through 47 in aligned relation on opposite sides of the bore hole 4 arranged transversely to the first mentioned surface seismometers. All of the surface seismometers are connected by suitable conduits or leads 48 to the recorder 22. Thus, the surface seismometers provide an X-spread straddling the bore hole 4 to receive the components of the reflected waves which are refracted upwardly to the surface irrespective of the direction of the reef 30 or other reflecting surface, as well as the distance thereof from the bore hole 4.

In addition to the horizontal seismic waves described above, the charge 24 will also create seismic waves which will penetrate the lower bedding plane 50 of the formation 10. Thus, a reef or the like (not shown), positioned at a level below the charge 24, will also reflect a portion of the seismic waves. Therefore, the location of the oil bearing formation will be determined, irrespective of the depth. However, the greatest area which will be covered will be in the formation 10, i. e., the formation in which the charge 24 is detonated.

To increase the area investigated, the charge 24 may be in the form of what is commonly called a "shaped charge." A "shaped charge" is substantially conical in shape to control the dispersement of energy therefrom. With the use of such a charge in the present method, the energy may be directed horizontally in the formation 10 to control the direction of travel of the seismic waves, as well as to increase the distance of travel of the waves.

In order to precisely determine the distance of the reef 30 from the bore hole 4, I contemplate detonating a charge (not shown) in the formation 10 from a bore hole (not shown) located a known distance from the bore hole 4. By shooting from three different bore holes of known distances and locations apart and recording in each the reflections from buried geological features, it is possible to determine uniquely the distances and directions to such buried feature. The horizontal seismic waves generated by the last mentioned detonation may be received by the seismometers 12 through 19 to determine the velocity at which seismic waves will travel in the formation 10. Thus, the distance of the reef 30 from the bore hole 4 may be determined with certainty by calculations well known in the art. Obviously, seismometers (not shown) may also be provided in the second mentioned bore hole at a depth corresponding to the formation 10 to receive seismic waves generated by the charge 24, whereby the velocity of the waves in the formation 10 may be determined.

It will be apparent that the velocity characteristics of the various formations will differ. The velocity characteristics in the formation 8 above formation 10, as well as formation 50 below, will in most instances have contrasting velocity characteristics. One of the important features of the present invention is that the transmitted and reflected energy from the charge 24 is substantially confined within the formation in which it is detonated due to these variable velocity characteristics. The waves transmitted are contained within the strata within which they are shot. However, it will be apparent that some waves may be refracted into stratas either above or below having different velocity characteristics.

From the foregoing, it will be apparent that the present invention provides a novel method of geophysical prospecting whereby the maximum area may be investigated in a minimum of time. Since both the charge and the principal seismometer spread are disposed at a depth well exceeding the depth of the numerous shallow formations, all surface disturbances will be evaded. Furthermore, the incident and reflected seismic waves will travel in directions heretofore unknown in seismic exploration to locate various types of oil bearing formations impossible of location by surface or shallow exploration.

Changes may be made in the combination and arrangement of parts and steps as heretofore set forth in the specification and shown in the drawings, it being understood that any modification in the precise embodiment of the invention may be made within the scope of the following claims without departing from the spirit of the invention.

I claim:

1. A method of seismic exploration for oil bearing formations, comprising creating a seismic blast in the lower portion of a deep bore hole, whereby a portion of the seismic waves will travel substantially horizontally at a height commensurate with a potential oil bearing formation, receiving the reflected waves in the bore hole at a height substantially corresponding to the height of the seismic blast, recording the horizontally reflected waves, receiving the components of the reflected waves which are refracted up to the surface of the earth, and recording said refracted components to determine the direction of reflection of the seismic waves.

2. A method of seismic exploration for oil bearing formations, comprising creating a seismic blast in the lower portion of a deep bore hole, whereby a portion of the seismic waves will travel substantially horizontally at a height commensurate with a potential oil bearing formation, receiving the reflected waves in the bore hole at a height substantially corresponding to the height of the seismic blast, recording the horizontally reflected waves, receiving the components of the reflected waves which are refracted up to the surface of the earth, recording said components to determine the direction of reflection of the seismic waves, subsequently creating a seismic blast in a bore hole a known distance from the first bore hole at substantially the same level as the first mentioned blast, receiving a portion of the horizontally directed seismic waves created by the second blast in the first mentioned bore hole, and recording the last mentioned seismic waves to determine the speed of travel of said waves, whereby the location of the oil bearing formation may be determined.

3. A method of seismic exploration for oil bearing formations located in a sub-surface stratum, comprising arranging a plurality of vertically spaced seismometers in a well bore at a depth substantially equal to the oil bearing formation, arranging a blasting charge in the well bore in the vicinity of the seismometers, arranging a plurality of seismometers on the earth's surface in various directions from the bore hole, and detonating the blasting charge, whereby a portion of the seismic waves will be directed essentially parallel to the upper and lower boundaries of the containing stratum and substantially confined within the upper and lower boundaries of said stratum for reflection from the oil bearing formation to the seismometers arranged in the bore hole, and the components of the reflected waves which are refracted up to the surface will be received by the seismometers arranged on the surface.

4. A method of seismic exploration for oil bearing formations located in a sub-surface stratum, comprising arranging a plurality of vertically spaced seismometers in a well bore at a depth substantially equal to the oil bearing formation, arranging a blasting charge in the well bore in the vicinity of the seismometers, arranging a plurality of seismometers on the earth's surface in various directions from the bore hole, detonating the blasting charge, whereby a portion of the seismic waves will be directed essentially parallel to the upper and lower boundaries of the containing stratum and substantially confined within the upper and lower boundaries of said stratum for reflection from the oil bearing formations to the seismometers arranged in the bore hole, and the components of the reflected waves which are refracted up to the surface will be received by the seismometers arranged on the surface, subsequently creating seismic waves a known distance from the bore hole at a depth substantially equal to the depth of the first mentioned blast, and receiving the horizontally directed seismic waves created by the second blast, whereby the speed of travel of seismic waves at said depth may be determined.

References Cited in the file of this patent

UNITED STATES PATENTS

| | | |
|---|---|---|
| 1,240,328 | Fessenden | Sept. 18, 1917 |
| 1,909,205 | McCollum | May 16, 1933 |
| 2,021,943 | McCollum | Nov. 26, 1935 |
| 2,233,992 | Wyckoff | Mar. 4, 1941 |
| 2,276,306 | Hoover et al. | Mar. 17, 1942 |
| 2,276,335 | Peterson | Mar. 17, 1942 |
| 2,503,904 | Dahm | Apr. 11, 1950 |
| 2,557,714 | Williams | June 19, 1951 |